United States Patent
Wada et al.

(10) Patent No.: US 8,328,998 B2
(45) Date of Patent: Dec. 11, 2012

(54) OZONE GENERATING APPARATUS

(75) Inventors: Noboru Wada, Tokyo (JP); Masaki Kuzumoto, Tokyo (JP); Yasutaka Inanaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 332 days.

(21) Appl. No.: 12/685,358

(22) Filed: Jan. 11, 2010

(65) Prior Publication Data

US 2010/0108493 A1 May 6, 2010

Related U.S. Application Data (62) Division of application No. 11/097,336, filed on Apr. 4, 2005, now Pat. No. 7,713,495.

(30) Foreign Application Priority Data

Apr. 8, 2004 (JP) ................................ 2004-114588
Feb. 4, 2005 (JP) ................................ 2005-029109

(51) Int. Cl.
*B01J 19/08* (2006.01)
(52) U.S. Cl. ........................................................ 204/176
(58) Field of Classification Search .................... 204/176
See application file for complete search history.

(56) References Cited

U.S. PATENT DOCUMENTS

| | | | |
|---|---|---|---|
| 5,882,609 A * | 3/1999 | Shiota et al. | 422/186.07 |
| 5,932,180 A | 8/1999 | Zhang et al. | |
| 6,046,533 A | 4/2000 | Nakatsuka | |
| 6,093,289 A | 7/2000 | Kuzumoto et al. | |
| 6,322,759 B1 * | 11/2001 | Riege et al. | 422/186.07 |
| 7,402,289 B2 | 7/2008 | Tabata | |
| 2009/0283399 A1 | 11/2009 | Wada et al. | |

FOREIGN PATENT DOCUMENTS

| | | |
|---|---|---|
| JP | 1-282104 | 11/1989 |
| JP | 1-298003 | 12/1989 |
| JP | 6-305710 | 11/1994 |
| JP | 7-277707 | 10/1995 |
| JP | 9-235105 | 9/1997 |
| JP | 10-139404 | 5/1998 |
| JP | 11-21110 | 1/1999 |
| JP | 11-278809 | 10/1999 |
| JP | 2000-149799 | 5/2000 |

(Continued)

OTHER PUBLICATIONS

Maryniak et al. "Trek Application Note, No. 1000", pp. 1-4, 2003.

(Continued)

*Primary Examiner* — Kishor Mayekar
(74) *Attorney, Agent, or Firm* — Oblon, Spivak, McClelland, Maier & Neustadt, L.L.P.

(57) ABSTRACT

An ozone generating apparatus is provided which includes a pair of electrodes for producing a discharge by the application of an ac voltage therebetween, and at least one dielectric provided between the pair of electrodes. A source gas containing oxygen is provided into a discharge space in which the discharge is produced to generate ozone by the action of the discharge. A surface lying between at least one of the pair of electrodes and the discharge space and in contact with the discharge has a surface resistivity of $10^4 \Omega$ to $10^{11} \Omega$. The source gas provided into the discharge space includes ultra-pure oxygen having a purity of not less than 99.9%.

6 Claims, 8 Drawing Sheets

FOREIGN PATENT DOCUMENTS

| | | |
|---|---|---|
| JP | 2001-294407 | 10/2001 |
| JP | 2002-20105 | 1/2002 |
| JP | 3416982 | 4/2003 |
| JP | 2003-178854 | 6/2003 |

OTHER PUBLICATIONS

Chinese Office Action issued Mar. 1, 2012, in Patent Application No. 201010168162.8 (with Partial English-language and Japanese translation).

Chinese Office Action issued Nov. 9, 2011, in Patent Application No. 201010168162.8 (with Partial English-language and Japanese translation).

Chinese Office Action issued Jun. 27, 2011, in Patent Application No. 201010168162.8 (with English-language and Japanese translation).

Office Action issued Dec. 21, 2010, in China Patent Application No. 201010168162.8 (with English-language Translation).

Chinese Office Action issued on May 17, 2012, in Chinese Patent Application No. 200510056299.3 (with Partial English Language and Japanese Translation).

Kohichi Hashimoto et al., "Ozone Generation Properties using High Purity Oxygen Gas", The Institute of Electrical Engineering of Japan, ED-00-109, pp. 29-33 (with English Abstract).

* cited by examiner

F I G . 1 5

OZONE GENERATING APPARATUS

CROSS-REFERENCE TO RELATED APPLICATIONS

This application is a divisional Application of, and claims the benefit of priority under 35 U.S.C. §120 from, U.S. application Ser. No. 11/097,336, filed Apr. 4, 2005, herein incorporated by reference, which claims the benefit of priority under 35 U.S.C. §119 from Japanese Patent Applications Nos. 2004-114588 filed Apr. 8, 2004 and 2005-029109, filed Feb. 4, 2005.

BACKGROUND OF THE INVENTION

1. Field of the Invention

The present invention relates to an ozone generating apparatus for generating a high concentration of clean ozone gas free of nitrogen oxides ($NO_X$) by using ultrapure oxygen as a source gas.

2. Description of the Background Art

In a conventional silent discharge ozone generating apparatus operating with a discharge gap length of about 1.0 mm or greater, a discharge occurring in a discharge space is made up of a multiplicity of micro-discharge streamers, as disclosed in, for example, Japanese Patent No. 3416982 (paragraphs 19 and 20), and Japanese Patent Application Laid-Open No. 7-277707 (1995) (paragraphs 19 and 20). In such a case, the increase in the number of locations in which the micro-discharge streamers occur promotes collisions between electrons and oxygen molecules to improve ozone generation efficiency. To increase the number of locations in which the micro-discharge streamers occur, Japanese Patent No. 3416982 discloses a dielectric having a surface resistance (surface resistivity) of $10^9 \Omega$ to $10^{13} \Omega$. To facilitate the accumulation of electrical charges in an electrode surface, Japanese Patent Application Laid-Open No. 7-277707 discloses a high-resistance film formed on a surface of a dielectric in contact with a gap portion and having a surface resistance value (surface resistivity) of not less than $10^{11} \Omega$.

It has been known that, even when the discharge gap length of not greater than 1.0 mm is provided to achieve a condition which allows the generation of an extremely high concentration of ozone, high ozone generation efficiency cannot be maintained without the addition of nitrogen, carbon dioxide or the like to a source gas if the source gas is ultrapure oxygen (having a purity of not less than 99.9%). A conventional technique for solving this problem is disclosed in, for example, Japanese Patent Application Laid-Open No. 11-021110 (1999) (paragraphs 10 and 11) showing that the high ozone generation efficiency can be maintained without the addition of nitrogen or the like by containing not less than 10% by weight of titanium oxide in terms of the proportion of the amount of metal element at least in a surface layer portion of a dielectric stacked on the surface of an electrode.

In ozone application processes, particularly ozone applications to semiconductor and liquid crystal manufacturing processes, there is a need to increase the concentration of ozone with the size reduction and integration in manufacturing processes. In addition to the increase in concentration, challenges presented are to provide a high concentration of clean ozone free of metal contamination and to provide a high concentration of ozone free of nitrogen oxides ($NO_X$) so as to prevent corrosion and the like in a manufacturing apparatus.

The increase in the concentration of ozone has been accomplished by innovative technology development such that the discharge gap length is set at not greater than 0.1 mm and such that the action of decomposition of generated ozone is suppressed in a discharge field. The generation of clean ozone free of metal contamination has been accomplished by forming a clean discharge space covered with a dielectric so as to prevent metal from being exposed to the discharge field. For a high concentration of ozone for use in clean processes as mentioned above, ultrapure oxygen (having a purity of not less than 99.9%) is employed as the source gas for use in an ozone generating apparatus.

It has, however, been confirmed that the use of the ultrapure oxygen as the source gas makes it impossible to generate a high concentration of ozone and makes it difficult to maintain the ozone generation efficiency, resulting in performance change with time, as disclosed in, for example, Japanese Patent Application Laid-Open No. 11-021110, paragraph 5. For this reason, the common practice is to introduce an additive gas such as nitrogen and the like into the ultrapure oxygen, thereby maintaining the high concentration and high efficiency. The nitrogen that accompanies the source gas, however, inevitably gives rise to the production of $NO_X$ as a side effect in addition to a high concentration of ozone in a plasma field. It is, therefore, desired to develop a high-concentration ozone generating apparatus which does not add nitrogen to the source gas, that is, which does not produce $NO_X$.

Experiments have shown that, for the discharge gap length of not greater than 1.0 mm or for generation of a high concentration of ozone, it is impossible to accomplish high ozone generation efficiency by employing a dielectric or a high-resistance film having a surface resistivity of not less than $10^{11} \Omega$ as in a conventional technique or by simply increasing the number of locations in which the micro-discharge streamers occur if ultrapure oxygen is used as the source gas.

If the discharge gap length is not greater than 1.0 mm and a photocatalytic function is imparted, it is difficult for energy derived from light to compensate for the shortage of energy derived from the discharge because the ozone generating energy derived from light is extremely low relative to the ozone generating energy derived from the discharge. It is therefore impossible for this attempt to generate a high concentration of ozone and to maintain the ozone generation efficiency. Further, this attempt lacks reliability because of wide variations depending on the method and material of a photocatalytic thin film.

In view of the foregoing, there are no practical means for generating a high concentration of ozone free of nitrogen oxides and for maintaining the high ozone generation efficiency when ultrapure ozone is used as the source gas.

SUMMARY OF THE INVENTION

It is an object of the present invention to provide an ozone generating apparatus capable of generating a high concentration of ozone gas free of nitrogen oxides with a high degree of efficiency when ultrapure oxygen having a purity of not less than 99.9% is used as a source gas.

According to the present invention, an ozone generating apparatus includes a pair of electrodes for producing a discharge by the application of an ac voltage therebetween, and at least one dielectric provided between the pair of electrodes. The ozone gas generating apparatus according to the present invention provides a source gas containing oxygen into a discharge space in which the discharge is produced to generate ozone by the action of the discharge. A surface lying between at least one of the pair of electrodes and the discharge space and in contact with the discharge has a surface resistivity of $10^4\Omega$ to $10^{11}\Omega$. The source gas provided into the discharge space includes ultrapure oxygen having a purity of not less than 99.9%.

The surface resistivity of the surface lying between the at least one of the pair of electrodes and the discharge space ranges from $10^4\Omega$ to $10^{11}\Omega$. This allows the moderate leakage of unnecessary negative electrical charges accumulated in the electrode surface, thereby to suppress ineffective energy consumption caused by ions among energy consumptions in the discharge space. Therefore, the ozone generating apparatus is capable of accomplishing a discharge with high energy efficiency, and capable of generating a high concentration of ozone gas free of nitrogen oxides with a high degree of efficiency even when ultrapure oxygen having a purity of not less than 99.9% is used as the source gas.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
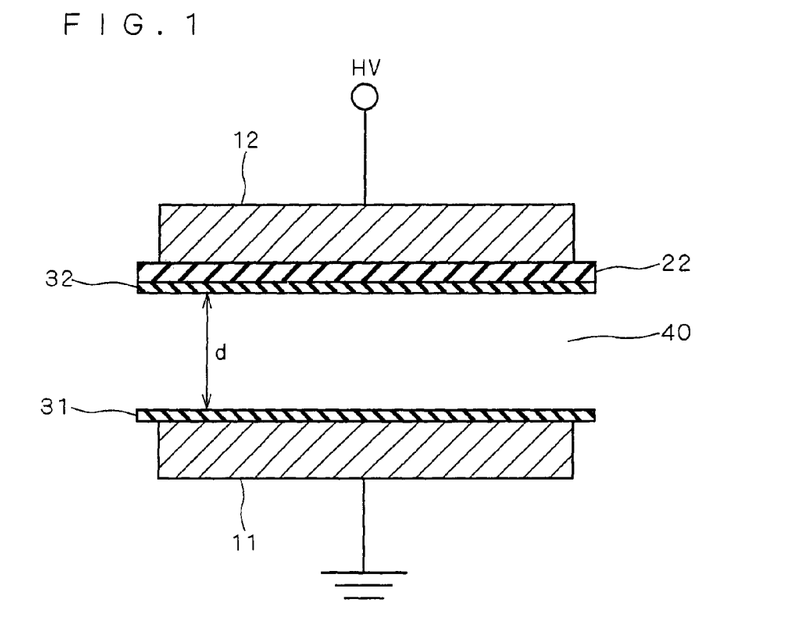
FIGS. 1 and 2 are views for illustrating an ozone generating apparatus according to a first preferred embodiment of the present invention.
Figure 2:
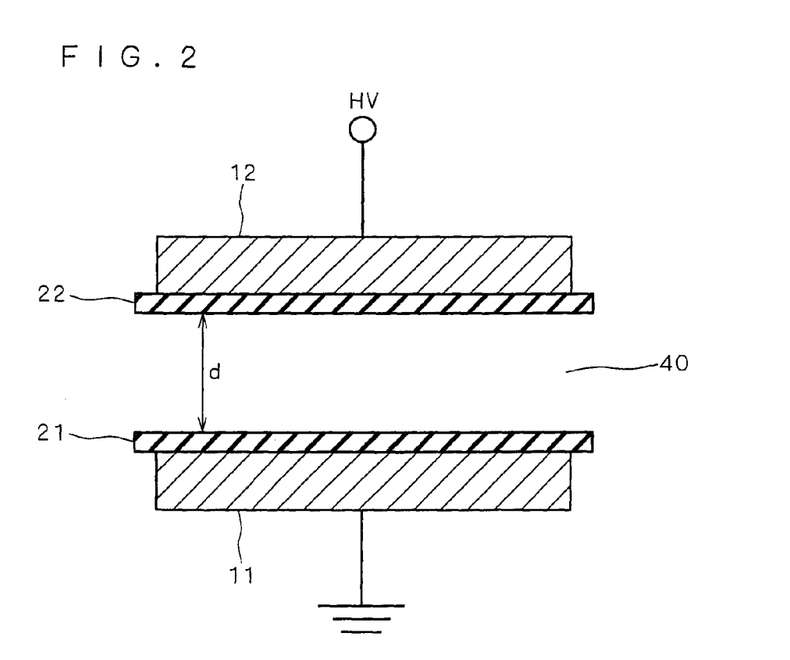

FIGS. 1 and 2 are views for illustrating an ozone generating apparatus according to a first preferred embodiment of the present invention. More specifically, FIG. 1 is a sectional view showing a construction of an electrode section according to the first preferred embodiment, and FIG. 2 is a sectional view showing a construction of a conventional typical parallel plate electrode section for use in a silent discharge ozone generating apparatus.

As illustrated in FIG. 2, the conventional typical parallel plate electrode section for use in the silent discharge ozone generating apparatus includes a pair of electrodes, i.e. an earthed electrode (metal electrode) 11 and a high-voltage electrode (metal electrode) 12, and dielectrics 21 and 22. The pair of earthed and high-voltage electrodes 11 and 12 are provided so that the dielectrics 21 and 22 lie between the pair of electrodes 11 and 12 and in contact with the pair of electrodes 11 and 12, respectively, and so that a certain gap length or spacing d is maintained therebetween. This gap length d is referred to hereinafter as a discharge gap length, and a space defined by the discharge gap length is referred to hereinafter as a discharge space 40. The pair of electrodes 11 and 12 are opposed to each other, with the discharge space 40 therebetween, and the discharge space 40 has the discharge gap length d.

The earthed electrode 11 and the high-voltage electrode 12 are typically metal electrodes made of metal such as, for example, stainless steel. The surface resistivity of the metal electrodes is not greater than $10^2\Omega$. The dielectrics 21 and 22 are made of an electrically insulating material, for example, having a volume resistivity of not less than $10^9$ $\Omega$·cm and a dielectric strength of not less than 5 kV/mm. Specifically, the electrically insulating material used as the dielectrics 21 and 22 may include glass, alumina and the like.

A passageway for a cooling fluid such as tap water, pure water and the like is formed inside at least one of the earthed and high-voltage electrodes 11 and 12 to cool down the discharge space 40.

In the ozone generating apparatus having such an electrode configuration, a silent discharge plasma is generated in the discharge space 40 by the application of a high AC voltage between the earthed electrode 11 and the high-voltage electrode 12. A source gas containing oxygen is introduced into the discharge space 40. In the plasma within the discharge space 4, oxygen molecules are dissociated to oxygen atoms by electron collisions, so that ozone is generated by three body collision.

The electrode section as shown in FIG. 1 according to the first preferred embodiment is a parallel plate electrode section, and is similar in basic structure to that of FIG. 2 except that the dielectric 22 is disposed only on the high-voltage electrode 12 and that low-resistance elements 31 and 32 having a surface resistivity of $10^4\Omega$ to $10^{11}\Omega$ are provided on a surface of the earthed electrode 11 and a surface of the dielectric 22 both of which face the discharge space 40, that is, a surface of the earthed electrode 11 and a surface of the dielectric 22 both of which are in contact with the discharge. The material of the low-resistance elements 31 and 32 having the surface resistivity of $10^4\Omega$ to $10^{11}\Omega$ used herein includes tungsten oxide. The surface resistivity of the tungsten oxide varies between about $10^3\Omega$ and about $10^{12}\Omega$ depending on the amount of oxygen in the oxide. The tungsten oxide may have any one of the following structures: a crystalline structure, an amorphous structure and a mixture of crystalline and amorphous structures. The crystalline structure having a higher bond strength is desirable for practical use. The tungsten oxide used herein has an average thickness ranging from 1 μm to 50 μm.

The low-resistance elements 31 and 32 may adhere to, be joined to or be contacted under pressure with the earthed electrode 11 and the dielectric 22 in the form of bulk elements, or may be formed by film deposition such as sputtering, evaporation, spraying and the like or by coating.

The surface resistivities described in the first preferred embodiment and in subsequent preferred embodiments to be discussed later are values measured at ordinary temperature and at ordinary pressure by contacting under pressure a to-be-measured element with electrodes for measurement (a main electrode and a guard electrode) in conformity with a method of evaluation described in JIS (Japanese Industrial Standards) C2141 "Testing methods of ceramic insulators for electrical and electronic applications."

In the silent discharge plasma, electrical charges (electrons and ions) generated between the electrodes move inside micro-discharge streamers, spread out and are accumulated in the dielectric surface. The accumulated electrical charges cause a reverse electric field to occur in a discharge field, thereby stopping the discharge automatically prior to a transition to an arc discharge.

The conventional ozone generating apparatuses as disclosed in Japanese Patent No. 3416982 and Japanese Patent Application Laid-Open No. 7-277707 are operated with the discharge gap length d of about 1.0 mm or greater. For generation of ozone, the conventional ozone generating apparatuses are operated generally at a gas pressure P of about 1 to 3 atmospheres. To accomplish high-efficiency ozone generation in such a case, there arises a need to generate a large number of micro-discharge streamers to promote the dissociation of oxygen molecules. It has, therefore, been necessary to use a dielectric (high-resistance film) having a high surface resistivity of not less than $10^{11}\Omega$, thereby suppressing the leakage of the electrical charges from electrode surfaces to the outside, as disclosed in Japanese Patent No. 3416982 and Japanese Patent Application Laid-Open No. 7-277707 (although Japanese Patent No. 3416982 shows that the threshold value of the surface resistivity ranges from $10^9\Omega$ to $10^{13}\Omega$ for the purpose of increasing the number of locations in which the micro-discharge streamers occur). That is, it is necessary to form a structure such that the accumulation of electrical charges is dominant in the dielectric surface, and an insulating material having a high volume resistivity and a high surface resistivity such as glass and alumina has been used as the dielectric material.

An ozone generating apparatus required to generate a high concentration of ozone such as an ozone generating apparatus for use in semiconductor processes has a discharge gap length d of about 0.6 mm or less, and is used under conditions of high reduced electric field strength E/N (where E is an electric field strength and N is a gas density). It has been considered as common knowledge that a discharge field made up of a multiplicity of micro-discharge streamers is formed as in a conventional ozone generating apparatus when the discharge gap length d is not greater than 1.0 mm.

The inventors of the present invention, however, have discovered the fact, which upsets conventional wisdom, that the discharge configuration changes from the streamer-shaped configuration to an avalanche-shaped configuration depending on the discharge gap length d by directly observing the silent discharge plasma under conditions where the discharge gap length d is not greater than 1.0 mm by the use of the ozone generating apparatus having the electrode section shown in FIG. 2. Under conditions where the discharge gap length d is not greater than 0.6 mm, a trend appears remarkably toward the abrupt decrease in diameter of the micro-discharge streamers and the rapid increase in number density of the micro-discharge streamers per unit area. As the discharge gap length d decreases, the brightness of each micro-discharge streamer decreases and the amount of electrical charges thereof decreases. Under conditions where the discharge gap length d is not greater than 0.1 mm, it has been confirmed that the micro-discharge streamers no longer exist but an assemblage of a multiplicity of ultramicro-discharges appears to approach an avalanche discharge, that is, a discharge apparently free of micro-discharges.

In such an electrode structure that produces the avalanche discharge, technical advantages are no longer given by the use of the dielectric having a high surface resistivity for promotion of the accumulation of the electrical charges as disclosed in Japanese Patent No. 3416982 and Japanese Patent Application Laid-Open No. 7-277707.

Energy consumption within the discharge space consists of energy consumption caused by electrons which contribute to ozone generation and energy consumption caused by ions which do not contribute to ozone generation. The ratio between these energy consumptions is equal to the ratio between an electron current and an ion current, and is represented by an electron current ratio κ. For improvement in ozone generation efficiency, it is ideal to increase the electron current ratio κ, that is, to drift only the electrons without drifting the ions. The electron current ratio κ is close to ½ when the above-mentioned conventional ozone generating apparatus is used, that is, when a dielectric having a high surface resistivity is used.

Consideration will be given to a case in which ultrapure oxygen (having a purity of not less than 99.9%) is used as the source gas in an ozone generating apparatus operating in a range of the discharge gap length d of not greater than 0.6 mm under which conditions an abrupt change in discharge configuration occurs, that is, in a range of a high reduced electric field strength E/N, according to the past experiences of the inventors of the present invention. When a dielectric having a high volume resistivity (dielectric strength) and a high surface resistivity is used as in a conventional technique, the ozone generation efficiency thereof is extremely low. This is because the electron current ratio κ is considered to be sufficiently lower than ½ due to the above-mentioned discharge configuration discovered by the inventors of the present invention. Consideration will be given to a dielectric which instantaneously acts as a negative electrode among the dielectrics constituting the ozone generating apparatus. Because the instantaneously functioning negative electrode has previously been a positive electrode, negative electrical charges (ions and electrons) are accumulated in the surface of the dielectric. Due to the high surface resistivity of the dielectric, particularly the negative ions repeat the accumulation to become less prone to leak to the outside. Thus, the dielectric surface becomes a discharge field in which the accumulation of the negative ions is dominant and the drift thereof is dominant. In other words, the increase in ion current value and the decrease in electron current ratio K increase the energy consumption caused by ineffective ions to result in extremely low ozone generation efficiency.

As discussed above, the inventors of the present invention have discovered the fact that the excessive accumulation of the negative electrical charges (ions such as $O_2^-$, $O_3^-$ and the like) in the dielectric surface results in the decrease in electron current ratio κ so that the control of the accumulation of the negative electrical charges leads to the improvement in ozone generation efficiency, and have come up with the present invention.

For the increase in electron current ratio κ and improvement in ozone generation efficiency, the dielectric must not have a conventionally high surface resistivity. Because the accumulation of the negative electrical charges (ions) in the dielectric surface increases the ion current, the magnitude of the electron current ratio κ is determined by how to leak the negative electrical charges (ions) to the outside without accumulating the negative electrical charges (ions) in the dielectric surface. In other words, the dielectric is required to have such a low surface resistivity as to leak unnecessary accumulated electrical charges, rather than the conventionally high surface resistivity. It is, therefore, ideal to use a dielectric having a high volume resistivity and a low surface resistivity. The use of such a material provides a high setting of the electron current ratio κ to accomplish high ozone generation efficiency.

On the other hand, if the volume resistivity is high and the surface resistivity is further reduced, the leakage of the electrical charges is dominant, which results in too few accumulated electrical charges. In such a case, the accumulated electrical charges can no longer form the reverse electric field, and hence can no longer maintain the discharge.

Figure 3:
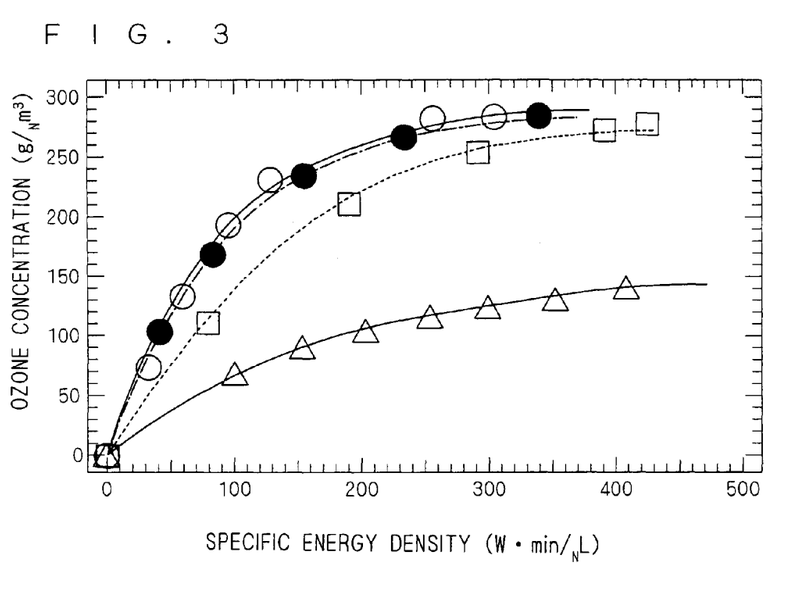
FIGS. 3 and 4 illustrate characteristics of the ozone generating apparatus according to the first preferred embodiment.

FIG. 3 shows ozone generation characteristics in the ozone generating apparatus having the structures shown in FIGS. 2 and 1 in which the discharge gap length d is 0.1 mm. Alumina (having a volume resistivity of not less than $10^9$ Ω·cm, a dielectric strength of not less than 5 kV/mm, and a surface resistivity of not less than $10^{12}$Ω) is used as the dielectrics 21 and 22. Tungsten oxides having surface resistivities of $10^5$Ω and $10^9$Ω are used as the low-resistance elements 31 and 32, respectively. The ordinate of FIG. 3 represents ozone concentration ($g/_Nm^3$), and the abscissa represents specific energy density ($W·min/_NL$). The specific energy density means the discharge power divided by the gas flow rate, and represents the discharge energy received by a single gas molecule. The gas pressure is 3.5 atmospheres, and the cooling fluid temperature is 20° C. An ultrapure oxygen gas having a purity of not less than 99.9% is used as the source gas.

It is found that maximum ozone generation efficiency (the gradient of the ozone generation characteristic curve for a low input) and a maximum concentration achieved are extremely low as indicated by triangles in FIG. 3 when alumina (having a surface resistivity of not less than $10^{12}$Ω) is used as the dielectrics 21 and 22 and the low-resistance elements 31 and 32 are not provided as shown in FIG. 2. It has been confirmed that the ozone generation characteristics in this case degrade with time.

On the other hand, consideration will be given to a case in which the dielectric 21 is not provided on the earthed electrode 11 but the low-resistance element 31 is directly formed on the earthed electrode 11 whereas the low-resistance element 32 is formed on the dielectric 22 on the high-voltage electrode 12 as shown in FIG. 1. When tungsten oxides (having surface resistivities of $10^5$Ω and $10^9$Ω) are used as the low-resistance elements 31 and 32 respectively and alumina is used as the dielectric 22, the maximum ozone generation efficiency and the maximum concentration achieved rapidly increase as indicated by open circles in FIG. 3, as compared with the case shown in FIG. 2, although ultrapure oxygen is used as the source gas. An extremely high ozone concentration of about 300 $g/_Nm^3$ heretofore not obtainable is accomplished, and no degradation of the ozone generation characteristics with time occurs. Of course, very little $NO_x$ is present in the generated ozone. Thus, excellent ozone generation characteristics are obtained.

Oxygen used herein as the source gas is ultrapure oxygen having a purity of not less than 99.9%, a purity of not less than 99.99%, a purity of not less than 99.999%, and a purity of not less than 99.9999%. In other words, the source gas is used herein in which nitrogen contained as an impurity in the oxygen gas is not greater than 0.1%, not greater than 0.01%, not greater than 0.001% and not greater than 0.0001%. Thus, the ozone generation characteristics similar to those described above are obtained without the addition of nitrogen.

This results from the fact that the provision of the low-resistance elements 31 and 32 having a somewhat low surface resistivity allows the electrical charges accumulated in the surface to be optimally controlled, thereby decreasing the accumulation of the negative electrical charges.

Similarly, when alumina is used as the dielectric 22 in the structure of FIG. 1 and the surface resistivity of the low-resistance elements 31 and 32 is further lower than $10^4$Ω, it is difficult to maintain the discharge and to generate ozone.

Figure 4:
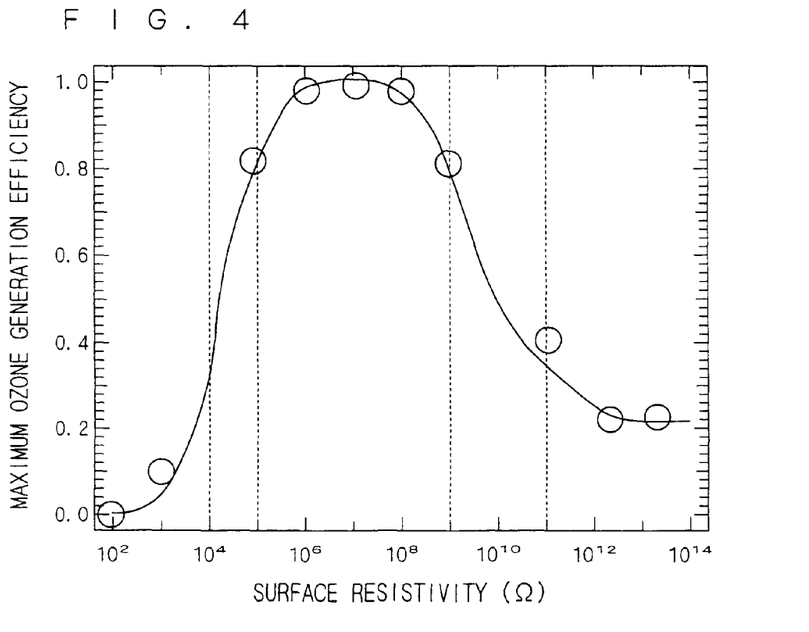

FIG. 4 shows changes in maximum ozone generation efficiency depending on the surface resistivity. The ordinate of FIG. 4 represents the maximum ozone generation efficiency (normalized so that the maximum value is equal to unity), and the abscissa represents the surface resistivity (Ω). A measured value for the surface resistivity of $10^2$Ω is a measurement result obtained when a metal electrode is used for both two surfaces lying between the two electrodes and the discharge space and contacting the discharge. Measured values for the surface resistivities of $10^3$ Ω, $10^5$ Ω, $10^6$ Ω, $10^7$ Ω, $10^8$Ω, $10^9$Ω and $10^{11}$Ω are measurement results obtained when tungsten oxide is used for both the two surfaces lying between the two electrodes and the discharge space and contacting the discharge. Measured values for the surface resistivities of $10^{12}$Ω and $10^{13}$Ω are measurement results obtained when alumina is used for both the two surfaces lying between the two electrodes and the discharge space and contacting the discharge.

The maximum ozone generation efficiency is extremely low when a dielectric having a high surface resistivity (a surface resistivity of not less than $10^{12}$Ω) is used for both the two surfaces lying between the two electrodes and the discharge space and contacting the discharge as in a conventional technique. On the other hand, the maximum ozone generation efficiency improves rapidly when the low-resistance elements 31 and 32 are provided, that is, when both the two surfaces lying between the two electrodes and the discharge space and contacting the discharge have a surface resistivity ranging from $10^4$Ω to $10^{11}$Ω. In particular, the improvement in maximum ozone generation efficiency is pronounced when the surface resistivity ranges from $10^5$Ω to $10^9$Ω. When both the two surfaces lying between the two electrodes and the discharge space and contacting the discharge have a resistivity of less than $10^4$Ω, the discharge cannot be maintained in some cases. This results in the abrupt decrease in maximum ozone generation efficiency, and sometimes makes it difficult to generate ozone itself.

It has been confirmed that the results shown in FIGS. 3 and 4 are accomplished for all of the values of the discharge gap length d ranging from 0.03 mm to 0.6 mm.

Also additionally indicated by squares in FIG. 3 are ozone generation characteristics obtained when nitrogen with a flow rate percentage of about 1% is added to ultrapure oxygen having an extremely high purity of not less than 99.9% as the source gas in the electrode structure shown in FIG. 2 in which the low-resistance elements 31 and 32 having a surface resistivity ranging from $10^4$Ω to $10^{11}$Ω are not provided but the dielectrics 21 and 22 are made of alumina. The ozone generation characteristics obtained when nitrogen is added show improvements over those obtained when no nitrogen is added (indicated by the triangles in FIG. 3), but does not reach the ozone generation characteristics obtained when the low-resistance elements (made of tungsten oxide) 31 and 32 are provided.

The nitrogen that accompanies the oxygen forms $NO_X$ (e.g., $NO_2$) in the plasma. The $NO_X$ reacts with, for example, $O_3^-$ which is a negative ion on the surfaces of the dielectrics 21 and 22 to form a nitrate ion, which in turn is adsorbed onto the surfaces as expressed by $$O_3^- + NO_2 \rightarrow NO_3^- + O_2 \quad (1)$$

When carbon dioxide which produces effects similar to those of nitrogen is added to oxygen, a carbonate ion is formed and adsorbed onto the surfaces by the reaction expressed by $$O_3^- + CO_2 \rightarrow CO_3^- + O_2 \quad (2)$$

Nitrogen and carbon dioxide form a nitrate ion and a carbonate ion in the plasma, and the nitrate ion and the carbonate ion are adsorbed and accumulated onto the surfaces of the dielectrics 21 and 22 to decrease the surface resistivity of the dielectrics 21 and 22. Thus, the amount of negative electrical charges such as $O_2^-$ and $O_3^-$ accumulated on the dielectric surfaces can be reduced. This improves the ozone generation characteristics when nitrogen and carbon dioxide are added to ultrapure oxygen. However, such ozone generation characteristics do not reach the ozone generation characteristics obtained when the low-resistance elements (made of tungsten oxide) 31 and 32 are used for the two surfaces lying between the electrodes and the discharge space and contacting the discharge, and also cannot avoid the generation of $NO_X$ when nitrogen is added.

The low-resistance element 32 is shown in FIG. 1 as disposed on the dielectric 22 formed on the high-voltage electrode 12 whereas the low-resistance element 31 is shown as disposed directly on the earthed electrode 11. Similar effects are produced when, in contrast, the low-resistance element 32 is disposed directly on the high-voltage electrode 12 and the low-resistance element 31 is disposed on a dielectric similar to the dielectric 22 formed on the earthed electrode 11.

As described above, the conventional theory of operation of the ozone generating apparatus does not hold when ultrapure oxygen (having a purity of not less than 99.9%) is used as the source gas in the ozone generating apparatus operating under conditions where the discharge gap length d is not greater than 0.6 mm, preferably not greater than 0.3 mm. For improvement in ozone generation efficiency (or ozone generation characteristics) and generation of a high concentration of ozone using no additive gas such as nitrogen, it is effective to provide surfaces having such a surface resistivity as to prevent the accumulation of negative electrical charges as the surfaces lying between the two electrodes 11 and 12 and the discharge space 40 and contacting the discharge in accordance with the change in discharge configuration newly discovered by the inventors of the present invention. It has been also found that the surface resistivity such as to prevent the accumulation of the negative electrical charges has an optimum range from $10^4 \Omega$ to $10^{11} \Omega$, preferably from $10^5 \Omega$ to $10^9 \Omega$.

Additionally, the pair of electrodes 11 and 12 in the first preferred embodiment, which are covered with the low-resistance element 31 and the dielectric 22 respectively, are prevented from being sputter-etched, thereby generating a high concentration of clean ozone free of metal contamination.

Second Preferred Embodiment

Figure 5:
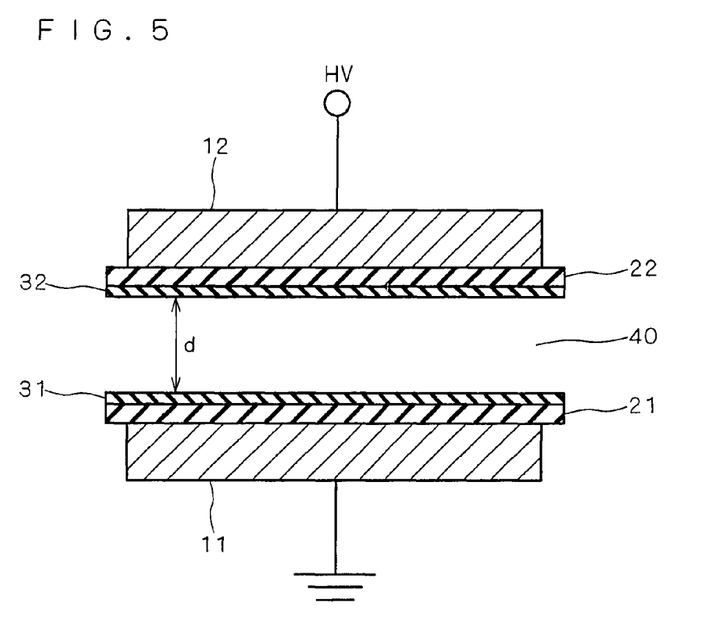
FIG. 5 is a view for illustrating the ozone generating apparatus according to a second preferred embodiment of the present invention.

FIG. 5 is a view for illustrating the ozone generating apparatus according to a second preferred embodiment of the present invention and, more specifically, is a sectional view showing the construction of the electrode section according to the second preferred embodiment.

Effects similar to those of the first preferred embodiment are produced in the ozone generating apparatus including the electrode section with the construction as shown in FIG. 5 and having a discharge gap length d of 0.1 mm.

The construction of the electrode section shown in FIG. 5 differs from that of the first preferred embodiment in that the dielectric 21 is provided between the earthed electrode 11 and the low-resistance element 31 in the structure of the first preferred embodiment shown in FIG. 1. The remaining construction of the second preferred embodiment is identical with that of the first preferred embodiment. Alumina (having a volume resistivity of not less than $10^9$ $\Omega$·cm, a dielectric strength of not less than 5 kV/mm, and a surface resistivity of not less than $10^{12} \Omega$) is used as the dielectrics 21 and 22.

Such a construction also provides excellent ozone generation characteristics in a similar manner to those of the first preferred embodiment when the electrical charges are moderately leaked from the surfaces of the low-resistance elements 31 and 32 and ultrapure oxygen (having a purity of not less than 99.9%) is used as the source gas.

Additionally, the pair of electrodes 11 and 12, which are covered with the dielectrics 21 and 22 respectively, are prevented from being sputter-etched, thereby generating a high concentration of clean ozone free of metal contamination.

Therefore, the ozone generating apparatus according to the second preferred embodiment is capable of generating a high concentration of clean ozone free of $NO_X$ and metal contamination with a high degree of efficiency.

Third Preferred Embodiment

Figure 6:
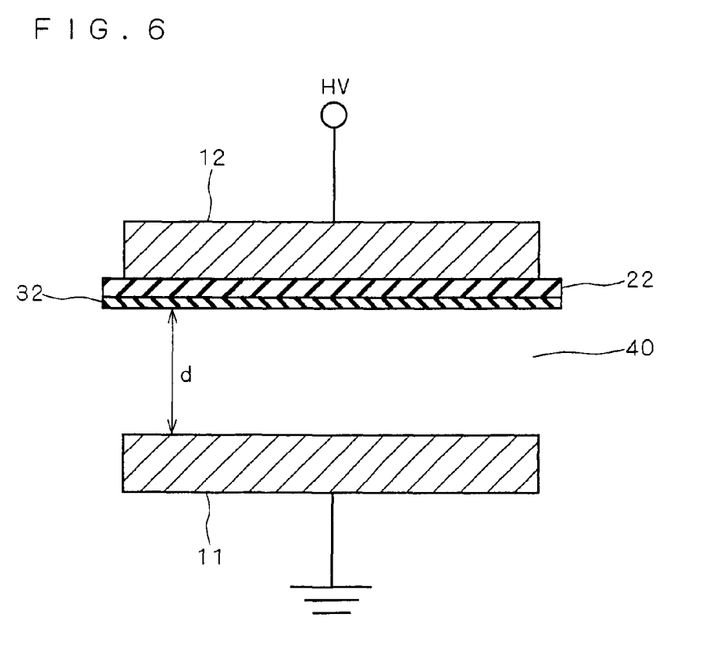
FIGS. 6 and 7 are views for illustrating the ozone generating apparatus according to a third preferred embodiment of the present invention.

FIG. 6 is a view for illustrating the ozone generating apparatus according to a third preferred embodiment of the present invention and, more specifically, is a sectional view showing the construction of the electrode section according to the third preferred embodiment.

Effects similar to those of the first preferred embodiment are produced in the ozone generating apparatus including the electrode section with the construction as shown in FIG. 6 and having a discharge gap length d of 0.1 mm.

The construction of the electrode section shown in FIG. 6 differs from that of the first preferred embodiment in that the earthed electrode 11 is not provided with the low-resistance element 31, but is in direct contact with the discharge in the structure of the first preferred embodiment shown in FIG. 1. The remaining construction of the third preferred embodiment is identical with that of the first preferred embodiment. Alumina (having a volume resistivity of not less than $10^9$ $\Omega$·cm, a dielectric strength of not less than 5 kV/mm, and a surface resistivity of not less than $10^{12} \Omega$) is used as the dielectric 22.

Thus, a surface lying between one of the two electrodes 11 and 12 (in this case, the high-voltage electrode 12) and the discharge space 40 and contacting the discharge has such a surface resistivity as to prevent the accumulation of negative electrical charges, and the other electrode (in this case, the earthed electrode 11) is in direct contact with the discharge. Such a construction produces effects similar to those of the first preferred embodiment when the accumulation of the electrical charges only on the dielectric 22 side is controlled (or the surface resistivity is reduced) because electrical charges are not accumulated in the metal electrode 11 which has a low resistance, but are accumulated only in the dielectric 22. That is, such a construction also provides excellent ozone generation characteristics in a similar manner to those of the first preferred embodiment when the electrical charges are moderately leaked from the surface of the low-resistance element 32 and ultrapure oxygen (having a purity of not less than 99.9%) is used as the source gas.

Therefore, the third preferred embodiment is capable of generating a high concentration of clean ozone free of $NO_X$ with a high degree of efficiency.

Figure 7:
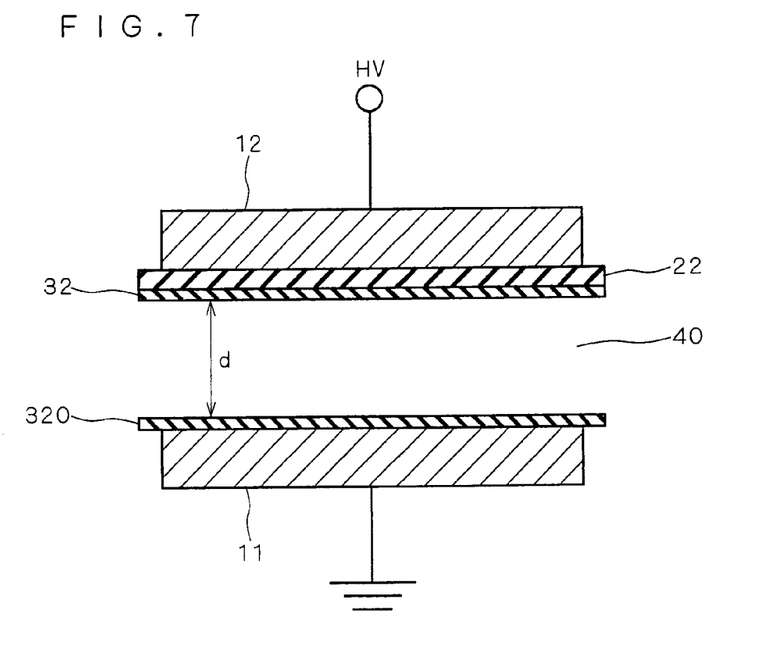

Even if the electrode section has the construction shown in FIG. 6 prior to the generation of the discharge, there are occasions when low-resistance element particles spattered by sputter-etching of the low-resistance element 32 in the plasma are deposited on and attach to the earthed electrode 11 to form a new low-resistance element 320, as shown in FIG. 7, depending on the conditions including the material of the low-resistance element 32, the state thereof (as to whether the low-resistance element 32 is in the form of a bulk element or is formed by film deposition such as sputtering, evaporation, spraying and the like or by coating), and the like.

On such occasions, the electrode section becomes similar in construction to that of the first preferred embodiment shown in FIG. 1. As in the first preferred embodiment, the low-resistance elements 320 and 32 having a surface resistivity of $10^4 \Omega$ to $10^{11} \Omega$ are used for the two surfaces lying between the two electrodes 11 and 12 and the discharge space 40 and contacting the discharge. Such a construction also provides excellent ozone generation characteristics in a similar manner to those of the first preferred embodiment when the electrical charges are moderately leaked from the surfaces of the low-resistance elements 320 and 32 and ultrapure oxygen (having a purity of not less than 99.9%) is used as the source gas.

Additionally, the pair of electrodes 11 and 12, which are covered with the low-resistance element 320 and the dielectric 22 respectively, are prevented from being sputter-etched, thereby generating a high concentration of clean ozone free of metal contamination.

Therefore, the third preferred embodiment is capable of generating a high concentration of clean ozone free of $NO_X$ and metal contamination with a high degree of efficiency.

Similar effects are produced when a dielectric similar to the dielectric 22 is provided between the earthed electrode 11 and the low-resistance element 320 in the structure shown in FIG. 7.

The low-resistance element 32 is shown in FIG. 6 as disposed on the dielectric 22 formed on the high-voltage electrode 12 whereas the earthed electrode 11 is shown as being in direct contact with the discharge. Similar effects are produced when, in contrast, the high-voltage electrode 12 is in direct contact with the discharge and a low-resistance element similar to the low-resistance element 32 is disposed on a dielectric similar to the dielectric 22 formed on the earthed electrode 11. Also in this case, there are occasions when a new low-resistance element similar to the low-resistance element 320 is formed on the high-voltage electrode 12 in a similar manner to FIG. 7.

Fourth Preferred Embodiment

Figure 8:
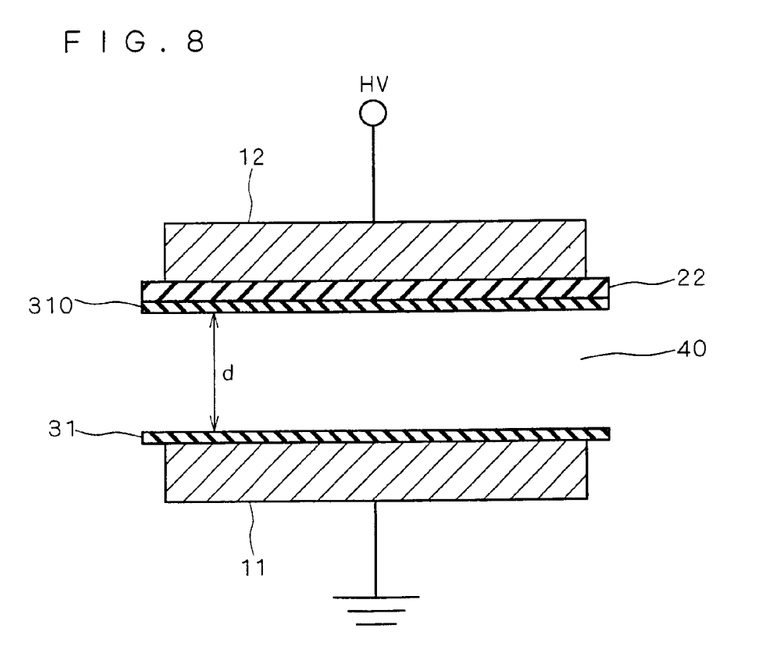
FIG. 8 is a view for illustrating the ozone generating apparatus according to a fourth preferred embodiment of the present invention.

FIG. 8 is a view for illustrating the ozone generating apparatus according to a fourth preferred embodiment of the present invention and, more specifically, is a sectional view showing the construction of the electrode section according to the fourth preferred embodiment.

Effects similar to those of the first preferred embodiment are produced in the ozone generating apparatus including the electrode section with the construction as shown in FIG. 8 and having a discharge gap length d of 0.1 mm.

The construction of the electrode section shown in FIG. 8 appears to be identical with the construction of the first preferred embodiment shown in FIG. 1. However, the fourth preferred embodiment differs from the first embodiment in that, unlike the low-resistance element 32 of the first preferred embodiment, a low-resistance element 310 formed on the dielectric 22 is not originally disposed but is formed in such a manner that low-resistance element particles spattered by sputter-etching of the low-resistance element 31 in the plasma are deposited on and attach to the dielectric 22 on the high-voltage electrode 12. The remaining construction of the fourth preferred embodiment is identical with that of the first preferred embodiment. Alumina (having a volume resistivity of not less than $10^9 \Omega \cdot cm$, a dielectric strength of not less than 5 kV/mm, and a surface resistivity of not less than $10^{12} \Omega$) is used as the dielectric 22.

In such a case, the construction of the electrode section is provided which is similar to that of the first preferred embodiment shown in FIG. 1. As in the first preferred embodiment, the low-resistance elements 31 and 310 having a surface resistivity of $10^4 \Omega$ to $10^{11} \Omega$ are used for the two surfaces lying between the two electrodes 11 and 12 and the discharge space 40 and contacting the discharge. Thus, such a construction provides excellent ozone generation characteristics in a similar manner to those of the first preferred embodiment when the electrical charges are moderately leaked from the surfaces of the low-resistance elements 31 and 310 and ultrapure oxygen (having a purity of not less than 99.9%) is used as the source gas.

Additionally, the pair of electrodes 11 and 12, which are covered with the low-resistance element 31 and the dielectric 22 respectively, are prevented from being sputter-etched, thereby generating a high concentration of clean ozone free of metal contamination.

Therefore, the ozone generating apparatus according to the fourth preferred embodiment is capable of generating a high concentration of clean ozone free of $NO_X$ and metal contamination with a high degree of efficiency.

Similar effects are produced when a dielectric similar to the dielectric 22 is provided between the earthed electrode 11 and the low-resistance element 31 in the structure shown in FIG. 8.

The earthed electrode 11 and the high-voltage electrode 12 may be interchanged with each other in FIG. 8, in which case similar effects are produced.

Fifth Preferred Embodiment

Figure 9:
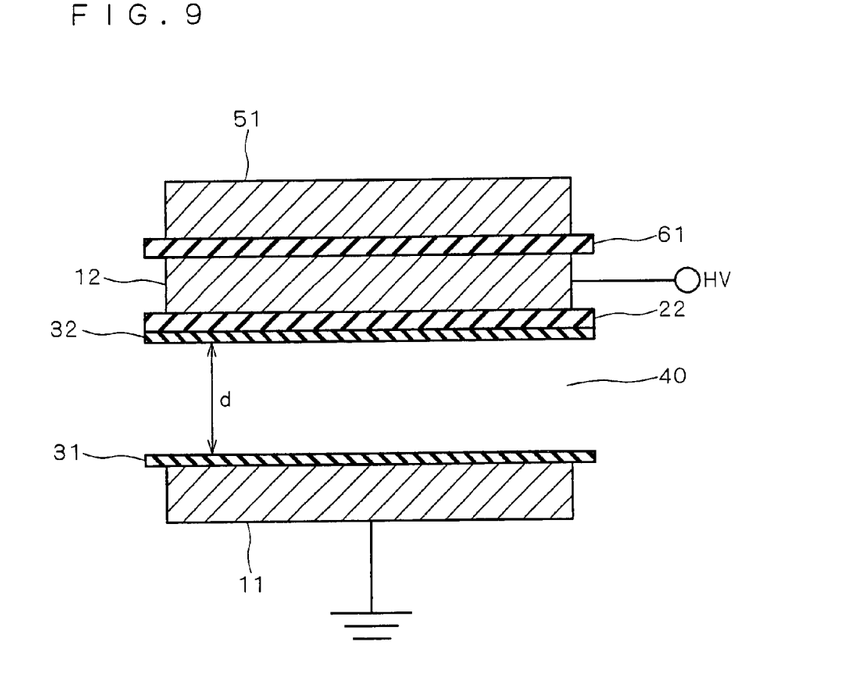
FIG. 9 is a view for illustrating the ozone generating apparatus according to a fifth preferred embodiment of the present invention.

FIG. 9 is a view for illustrating the ozone generating apparatus according to a fifth preferred embodiment of the present invention and, more specifically, is a sectional view showing the construction of the electrode section according to the fifth preferred embodiment.

Effects similar to those of the first preferred embodiment are produced in the ozone generating apparatus including the electrode section with the construction as shown in FIG. 9 and having a discharge gap length d of 0.1 mm.

The construction of the electrode section shown in FIG. 9 differs from that of the first preferred embodiment in that a heat sink 51 is provided on the opposite side of the high-voltage electrode 12 from the dielectric 22, with an electrical insulator 61 between the heat sink 51 and the high-voltage electrode 12. The remaining construction of the fifth preferred embodiment is identical with that of the first preferred embodiment.

The earthed electrode 11 is directly cooled by a cooling fluid passageway formed inside the earthed electrode 11. The high-voltage electrode 12, on the other hand, is indirectly cooled by the heat sink 51. If the same cooling fluid is circulated and used for the earthed electrode 11 and the heat sink 51, the provision of the insulator 61 prevents the occurrence of an electrical short resulting from the conductivity of the cooling fluid. Thus, a special fluid such as a pure water having a low conductivity need not be used as the cooling fluid, but a general tap water may be used.

Such a construction also provides excellent ozone generation characteristics in a similar manner to those of the first preferred embodiment when the electrical charges are moderately leaked from the surfaces of the low-resistance elements 31 and 32 and ultrapure oxygen (having a purity of not less than 99.9%) is used as the source gas. The fifth preferred embodiment is capable of generating a high concentration of clean ozone free of $NO_X$ and metal contamination with a high degree of efficiency.

The low-resistance element 32 is shown in FIG. 9 as disposed on the dielectric 22 formed on the high-voltage electrode 12 whereas the low-resistance element 31 is shown as disposed directly on the earthed electrode 11. Similar effects are produced when, in contrast, the low-resistance element 32 is disposed directly on the high-voltage electrode 12 and the low-resistance element 31 is disposed on a dielectric similar to the dielectric 22 formed on the earthed electrode 11.

Further, effects similar to those described above are produced when a dielectric similar to the dielectric 22 is provided between the earthed electrode 11 and the low-resistance element 31.

Sixth Preferred Embodiment

Figure 10:
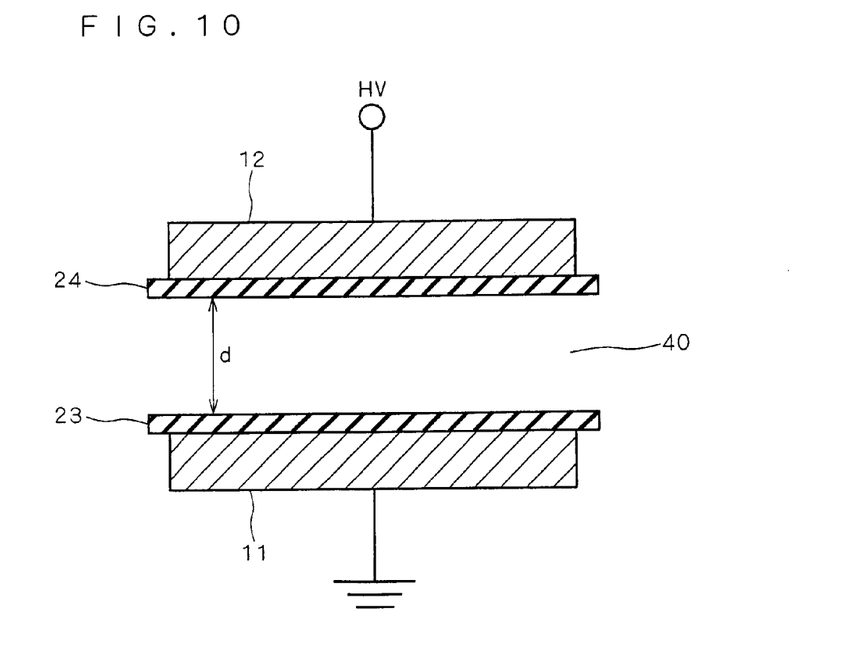
FIGS. 10 and 11 are views for illustrating the ozone generating apparatus according to a sixth preferred embodiment of the present invention.

FIG. 10 is a view for illustrating the ozone generating apparatus according to a sixth preferred embodiment of the present invention and, more specifically, is a sectional view showing the construction of the electrode section according to the sixth preferred embodiment.

A low-resistance dielectric made of low-resistance alumina having, for example, a volume resistivity of $10^9$ Ω·cm, a dielectric strength of not less than 5 kV/mm, and a surface resistivity of $10^9$Ω is used as dielectrics 23 and 24 in the sixth preferred embodiment.

A result of the test of the ozone generation characteristics in the ozone generating apparatus including the electrode section constructed as described above is indicated by solid circles in FIG. 3. The discharge gap length d is 0.1 mm. Operating conditions are similar to those of the first preferred embodiment, that is, the gas pressure of 3.5 atmospheres, and the cooling fluid temperature of 20° C. An ultrapure oxygen gas having a purity of not less than 99.9% is used as the source gas.

It is found from FIG. 3 that both the maximum ozone generation efficiency and the maximum concentration achieved increase rapidly in this preferred embodiment as in the first preferred embodiment (indicated by open circles in FIG. 3), as compared with the result of FIG. 2 (indicated by the triangles in FIG. 3). An extremely high ozone concentration of about 300 $g/_Nm^3$ heretofore not obtainable is accomplished, and no degradation of the ozone generation characteristics with time occurs. Of course, very little $NO_X$ is present in the generated ozone.

Effects similar to those described above are produced when low-resistance alumina having a surface resistivity of $10^5$Ω is used as the dielectrics 23 and 24.

This eliminates the need to provide the low-resistance element capable of leaking the accumulated electrical charges in the top surface of the dielectric having a high volume resistivity and serving as a barrier for the silent discharge as in the first preferred embodiment, because the low-resistance dielectrics 23 and 24 made of low-resistance alumina combines the functions of a dielectric and a low-resistance element. Thus, such a construction also provides excellent ozone generation characteristics when the electrical charges are moderately leaked from the surfaces of the low-resistance dielectrics 23 and 24 and ultrapure oxygen (having a purity of not less than 99.9%) is used as the source gas.

Additionally, the pair of electrodes 11 and 12, which are covered with the low-resistance dielectrics 23 and 24 respectively, are prevented from being sputter-etched, thereby generating a high concentration of clean ozone free of metal contamination.

Therefore, the ozone generating apparatus according to the sixth preferred embodiment is capable of generating a high concentration of clean ozone free of $NO_X$ and metal contamination with a high degree of efficiency.

Figure 11:
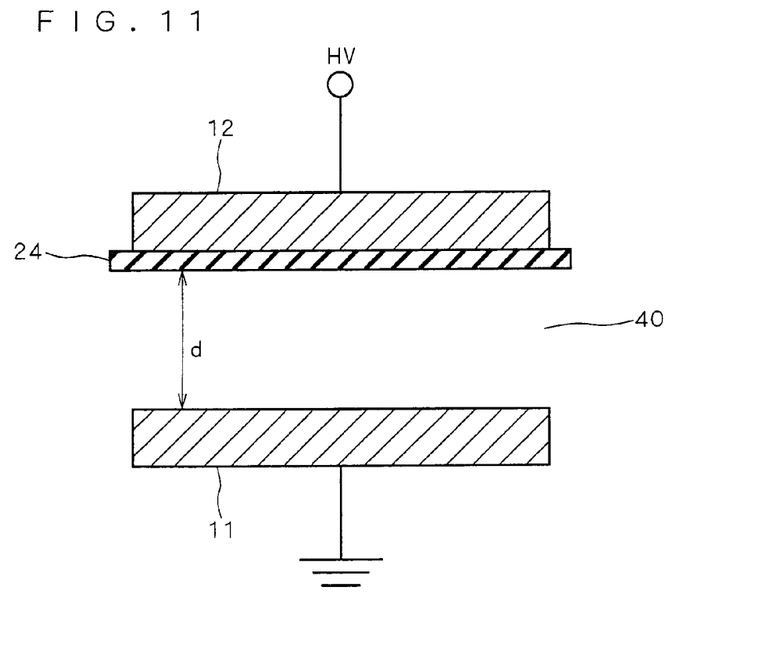

When the low-resistance dielectric 23 is not provided but only the low-resistance dielectric 24 is provided as shown in FIG. 11, the sixth preferred embodiment provides excellent ozone generation characteristics similar to those described above, and is capable of generating a high concentration of clean ozone free of $NO_X$ with a high degree of efficiency.

The surface resistivity of the low-resistance dielectrics 23 and 24 is not limited to $10^5$Ω and $10^9$Ω. It has, however, been confirmed that similar effects are produced when the surface resistivity of the low-resistance dielectrics 23 and 24 ranges from $10^4$Ω to $10^{11}$Ω, more preferably from $10^5$Ω to $10^9$Ω.

Seventh Preferred Embodiment

Figure 12:
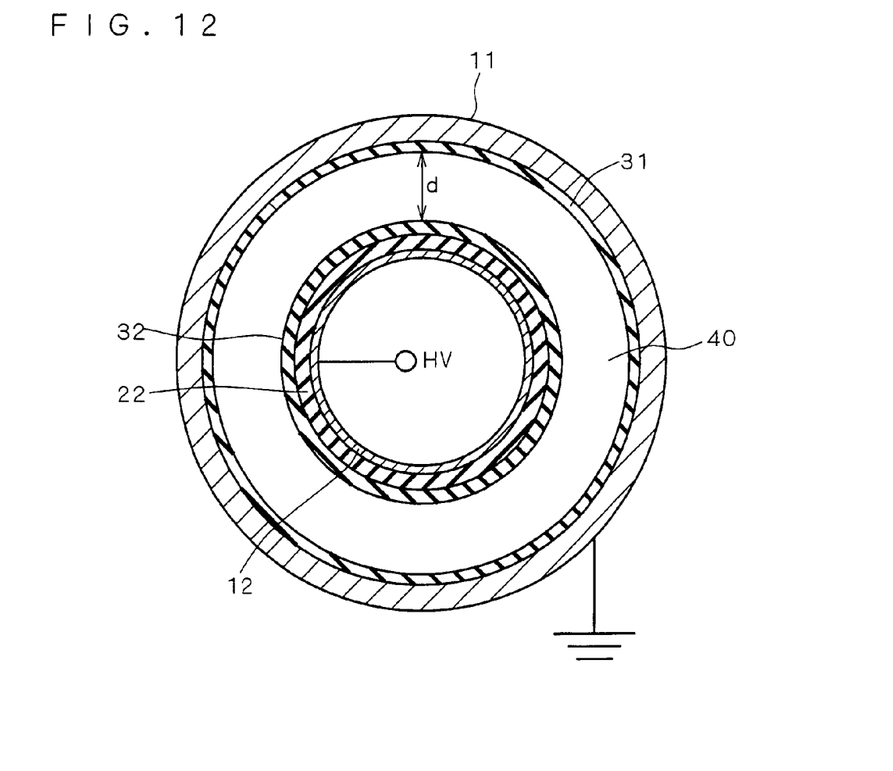
FIG. 12 is a view for illustrating the ozone generating apparatus according to a seventh preferred embodiment of the present invention.

FIG. 12 is a view for illustrating the ozone generating apparatus according to a seventh preferred embodiment of the present invention and, more specifically, is a sectional view showing the construction of the electrode section according to the seventh preferred embodiment.

Although the silent discharge ozone generating apparatus having the parallel plate electrode configuration is described in the above-mentioned preferred embodiments, a silent discharge ozone generating apparatus having a coaxial cylinder electrode configuration will be described in the seventh preferred embodiment.

Referring to FIG. 12, the earthed electrode 11, the high-voltage electrode 12 and the dielectric 22 are formed in a coaxial cylindrical shape, and one or both of the electrodes 11 and 12 are adapted to be cooled by a cooling fluid such as water. The earthed electrode 11 and the high-voltage electrode 12 are typically metal electrodes made of metal such as, for example, stainless steel. The surface resistivity of the metal electrodes is not greater than about $10^2$Ω. The dielectric 21 is made of an electrically insulating material, for example, having a volume resistivity of not less than $10^9$ Ω·cm and a dielectric strength of not less than 5 kV/mm. Specifically, the electrically insulating material used as the dielectric 22 may include glass, alumina and the like.

The low-resistance elements 31 and 32 having a surface resistivity of $10^4$Ω to $10^{11}$Ω are provided on a surface of the earthed electrode 11 and a surface of the dielectric 22 both of which face the discharge space 40, that is, a surface of the earthed electrode 11 and a surface of the dielectric 22 both of which are in contact with the discharge. The low-resistance elements 31 and 32 are made of tungsten oxide having a surface resistivity of $10^4$Ω to $10^{11}$Ω.

In the ozone generating apparatus having such an electrode configuration, a silent discharge plasma is generated in the discharge space 40 by the application of a high AC voltage between the earthed electrode 11 and the high-voltage electrode 12. Ultrapure oxygen is introduced into the discharge space 40 to generate ozone. The discharge gap length d is not greater than 0.6 mm.

Such a construction also provides excellent ozone generation characteristics in a similar manner to that of the first preferred embodiment when the electrical charges are moderately leaked from the surfaces of the low-resistance elements 31 and 32 and ultrapure oxygen (having a purity of not less than 99.9%) is used as the source gas.

Additionally, the pair of electrodes 11 and 12, which are covered with the low-resistance element 31 and the dielectric 22 respectively, are prevented from being sputter-etched, thereby generating a high concentration of clean ozone free of metal contamination.

Therefore, the ozone generating apparatus according to the seventh preferred embodiment is capable of generating a high concentration of clean ozone free of $NO_X$ and metal contamination with a high degree of efficiency.

Effects similar to those described above are produced when a dielectric similar to the dielectric 22 is provided between the earthed electrode 11 and the low-resistance element 31.

Although the construction of the first preferred embodiment is shown in FIG. 12 as applied to the ozone generating apparatus including the coaxial cylinder electrode section, the construction of any of the first to sixth preferred embodiments may be applied to produce effects similar to those of the above-mentioned preferred embodiments.

Eighth Preferred Embodiment

Figure 13:
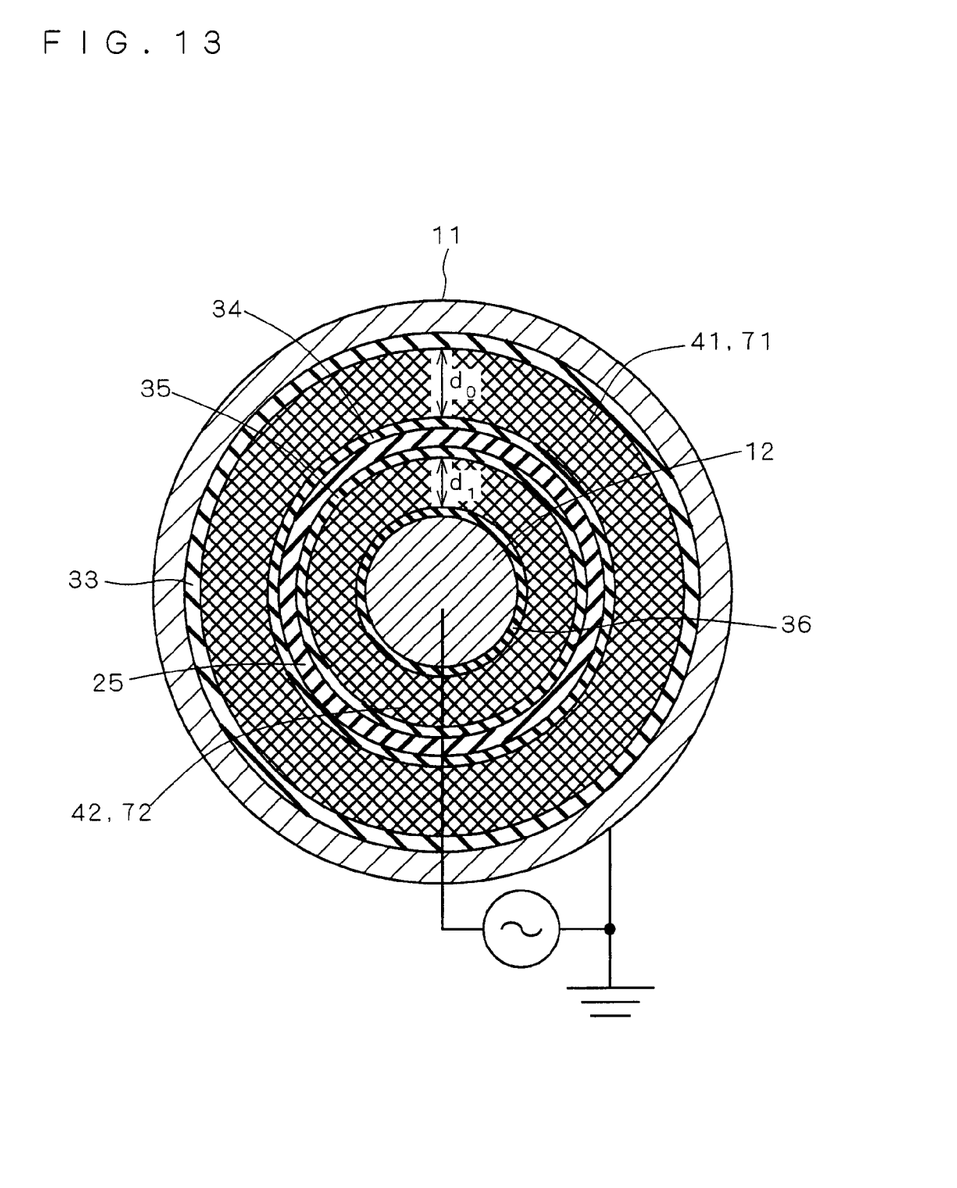
FIG. 13 is a view for illustrating the ozone generating apparatus according to an eighth preferred embodiment of the present invention.

FIG. 13 is a view for illustrating the ozone generating apparatus according to an eighth preferred embodiment of the present invention and, more specifically, is a sectional view showing the construction of the electrode section according to the eighth preferred embodiment.

Referring to FIG. 13, the earthed electrode 11, the high-voltage electrode 12 and a dielectric 25 are formed in a coaxial cylindrical shape, and one or both of the electrodes 11 and 12 are adapted to be cooled by a cooling fluid such as water. The dielectric 25 is made of an electrically insulating material, for example, having a volume resistivity of not less than $10^9$ Ω·cm and a dielectric strength of not less than 5 kV/mm. Specifically, the electrically insulating material used as the dielectric 25 may include glass, alumina and the like.

Discharge spaces 41 and 42 are formed between the earthed electrode 11 and the dielectric 25 and between the dielectric 25 and the high-voltage electrode 12, respectively. The discharge space 41 has a discharge gap length $d_0$ of not greater than 0.6 mm, and the discharge space 42 has a discharge gap length $d_1$ of not greater than 0.6 mm.

Low-resistance elements 33, 34, 35 and 36 having a surface resistivity of $10^4$Ω to $10^{11}$Ω are provided on surfaces of the earthed electrode 11, dielectric 25 and high-voltage electrode 12 which face the discharge spaces 41 and 42, that is, surfaces of the earthed electrode 11, dielectric 25 and high-voltage electrode 12 which are in contact with the discharge. The low-resistance elements 33 to 36 are made of tungsten oxide having a surface resistivity of $10^4$Ω to $10^{11}$Ω.

Further, the discharge spaces 41 and 42 are filled with gas-permeable knitted wires 71 and 72 having a high electrical conductivity and a high thermal conductivity. The provision of the knitted wires 71 and 72 creates turbulence in the discharge spaces 41 and 42 to cause gas molecules to collide with the cooled electrode surfaces. This allows the heat of the gas to be dissipated well. The knitted wires 71 and 72 also serve as an expansion material for center alignment between the earthed electrode 11, the high-voltage electrode 12 and the dielectric 25. Because the discharge spaces 41 and 42 are filled with the knitted wires 71 and 72, ozone yield is improved by the reduction in discharge gap lengths $d_0$ and $d_1$ and a hollow cathode effect (a local discharge plasma in a hollow space at the same potential).

In the ozone generating apparatus having such an electrode configuration, a silent discharge plasma is generated in the discharge spaces 41 and 42 by the application of a high AC voltage between the earthed electrode 11 and the high-voltage electrode 12. Ultrapure oxygen is introduced into the discharge spaces 41 and 42 to generate ozone.

Such a construction also provides excellent ozone generation characteristics in a similar manner to those of the first preferred embodiment when the electrical charges are moderately leaked from the surfaces of the low-resistance elements 33 to 36 and ultrapure oxygen (having a purity of not less than 99.9%) is used as the source gas.

Additionally, the pair of electrodes 11 and 12, which are covered with the low-resistance elements 33 and 36 respectively, are prevented from being sputter-etched, thereby generating a high concentration of clean ozone free of metal contamination.

Therefore, the ozone generating apparatus according to the eighth preferred embodiment is capable of generating a high concentration of clean ozone free of $NO_X$ and metal contamination with a high degree of efficiency.

Effects similar to those described above are produced when dielectrics similar to the dielectric 25 are provided between the earthed electrode 11 and the low-resistance element 33 and between the low-resistance element 36 and the high-voltage electrode 12.

The low-resistance elements 33 and 34 having the surface resistivity of $10^4$Ω to $10^{11}$Ω are shown in FIG. 13 as used for the two surfaces facing the discharge space 41. However, the low-resistance element 33 or 34 may be used for at least one of the two surfaces facing the discharge space 41. The same is true for the two surfaces facing the discharge space 42.

A low-resistance dielectric having a surface resistivity of $10^4$Ω to $10^{11}$Ω as illustrated in the sixth preferred embodiment may be used as the dielectric 25, and the low-resistance elements 34 and 35 may be dispensed with.

In the electrode configuration shown in FIG. 12 according to the seventh preferred embodiment, the discharge space 40 may be filled with a knitted wire similar to the knitted wires 71 and 72. In the parallel plate electrode configurations illustrated in the first to sixth preferred embodiments, the discharge space 40 may be filled with a knitted wire similar to the knitted wires 71 and 72.

Ninth Preferred Embodiment

Figure 14:
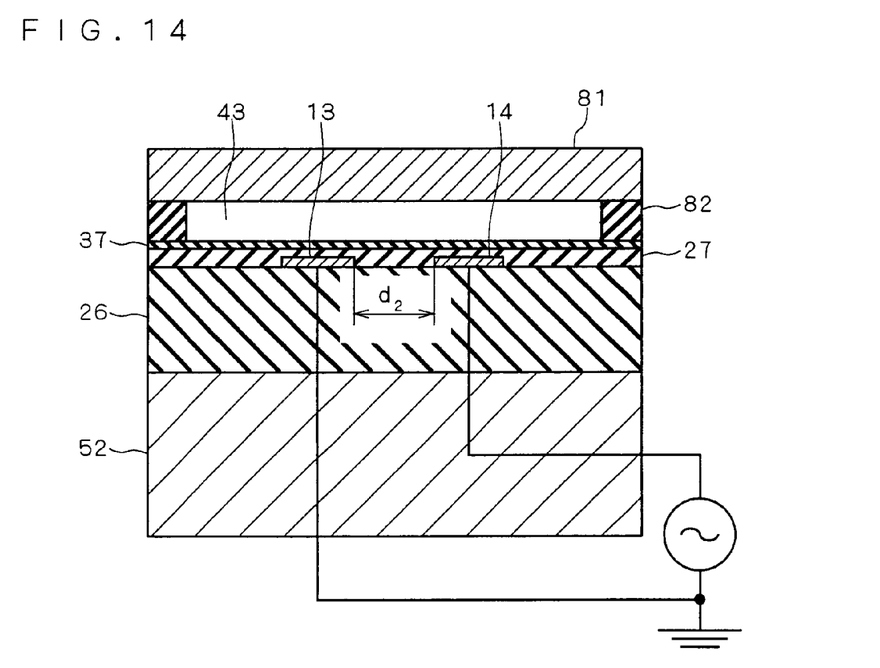
FIG. 14 is a view for illustrating the ozone generating apparatus according to a ninth preferred embodiment of the present invention.

FIG. 14 is a view for illustrating the ozone generating apparatus according to a ninth preferred embodiment of the present invention and, more specifically, is a sectional view showing the construction of the electrode section according to the ninth preferred embodiment.

Although the silent discharge ozone generating apparatus is described in the above-mentioned preferred embodiments, a surface discharge ozone generating apparatus will be described in the ninth preferred embodiment.

With reference to FIG. 14, a pair of electrodes 13 and 14 are arranged side by side on the surface of a dielectric 26, with a spacing $d_2$ of not greater than 0.1 mm therebetween (corresponding to the discharge gap length in the above-mentioned preferred embodiments). The pair of electrodes 13 and 14 are covered with a dielectric layer 27. The dielectric 26 is in contact with a heat sink 52, and is cooled by a cooling fluid such as water flowing inside the heat sink 52.

A low-resistance element 37 having a surface resistivity of $10^4 \Omega$ to $10^{11} \Omega$ is disposed on top of the dielectric layer 27, that is, on the opposite side of the dielectric layer 27 from the dielectric 26. The low-resistance element 37 is in contact with a guide plate 81, with a sealing member 82 such as a packing therebetween, to define a gas space (discharge space) 43 into which ultrapure oxygen serving as the source gas flows.

In the ozone generating apparatus having such an electrode configuration, a high AC voltage is applied between the pair of electrodes 13 and 14 to produce a surface discharge along the surface of the low-resistance element 37. This surface discharge generates ozone.

In such an ozone generating apparatus, the dielectric 26 used herein is made of glass, alumina and the like having a sufficiently high volume resistivity and a sufficiently high dielectric strength, and has a thickness set at a value sufficiently greater than the spacing $d_2$. An insulating material having a sufficiently high volume resistivity and a sufficiently high dielectric strength is also used as the dielectric layer 27.

Tungsten oxide having a surface resistivity of $10^4 \Omega$ to $10^{11} \Omega$ is used as the low-resistance element 37.

The guide plate 81 used herein is made of metal such as stainless steel or fluororesin such as PTFE (polytetrafluoroethylene) for suppression of the occurrence of metal contamination.

Such a construction also provides excellent ozone generation characteristics in a similar manner to those of the first preferred embodiment when the electrical charges are moderately leaked from the surface of the low-resistance element 37 and ultrapure oxygen (having a purity of not less than 99.9%) is used as the source gas.

Additionally, the pair of electrodes 13 and 14, which are covered with the dielectric layer 27, are prevented from being sputter-etched, thereby generating a high concentration of clean ozone free of metal contamination.

Therefore, the ozone generating apparatus according to the ninth preferred embodiment is capable of generating a high concentration of clean ozone free of $NO_X$ and metal contamination with a high degree of efficiency.

Unlike the silent discharge ozone generating apparatus, the surface discharge ozone generating apparatus produces effects similar to those described above also in a range of the surface resistivity of the low-resistance element 37 from $10^3 \Omega$ to $10^4 \Omega$.

Tenth Preferred Embodiment

Figure 15:
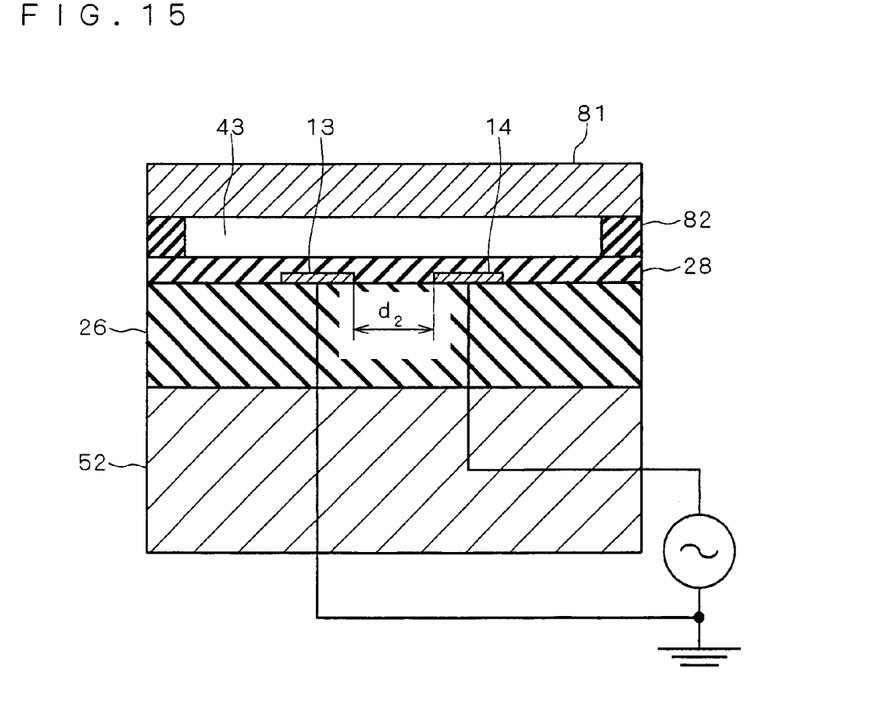
FIG. 15 is a view for illustrating the ozone generating apparatus according to a tenth preferred embodiment of the present invention.

FIG. 15 is a view for illustrating the ozone generating apparatus according to a tenth preferred embodiment of the present invention and, more specifically, is a sectional view showing the construction of the electrode section according to the tenth preferred embodiment.

With reference to FIG. 15, the pair of electrodes 13 and 14 are arranged side by side on the surface of the dielectric 26, with the spacing $d_2$ of not greater than 0.1 mm therebetween. The pair of electrodes 13 and 14 are covered with a low-resistance dielectric layer 28 having a surface resistivity of $10^4 \Omega$ to $10^{11} \Omega$.

The dielectric 26 is in contact with the heat sink 52, and is cooled by a cooling fluid such as water flowing inside the heat sink 52. The low-resistance dielectric layer 28 is in contact with the guide plate 81, with the sealing member 82 such as a packing therebetween, to define the gas space (discharge space) 43 into which ultrapure oxygen serving as the source gas flows.

In the ozone generating apparatus having such an electrode configuration, a high AC voltage is applied between the pair of electrodes 13 and 14 to produce a surface discharge the surface of the low-resistance dielectric layer 28. This surface discharge generates ozone.

In such an ozone generating apparatus, the dielectric 26 is made of glass, alumina and the like having a sufficiently high volume resistivity and a sufficiently high dielectric strength, and has a thickness set at a value sufficiently greater than the spacing $d_2$.

The low-resistance dielectric layer 28 used herein is made of low-resistance alumina having a volume resistivity of not less than $10^9$ $\Omega \cdot cm$, a dielectric strength of not less than 5 kV/mm, and a surface resistivity of $10^9 \Omega$.

The guide plate 81 used herein is made of metal such as stainless steel or fluororesin such as PTFE (polytetrafluoroethylene) for suppression of the occurrence of metal contamination.

Such a construction also provides excellent ozone generation characteristics in a similar manner to those of the sixth preferred embodiment when the electrical charges are moderately leaked from the surface of the low-resistance dielectric layer 28 and ultrapure oxygen (having a purity of not less than 99.9%) is used as the source gas.

Additionally, the pair of electrodes 13 and 14, which are covered with the low-resistance dielectric layer 28, are prevented from being sputter-etched, thereby generating a high concentration of clean ozone free of metal contamination.

Therefore, the ozone generating apparatus according to the tenth preferred embodiment is capable of generating a high concentration of clean ozone free of $NO_X$ and metal contamination with a high degree of efficiency.

Unlike the silent discharge ozone generating apparatus, the surface discharge ozone generating apparatus produced effects similar to those described above also in a range of the surface resistivity of the low-resistance dielectric layer 28 from $10^3 \Omega$ to $10^4 \Omega$.

Eleventh Preferred Embodiment

The use of a compound containing at least one selected from the group consisting of titanium, molybdenum, aluminum, magnesium, nickel, yttrium, zirconium, silicon and carbon in addition to tungsten oxide as the low-resistance element having the surface resistivity of $10^4 \Omega$ to $10^{11} \Omega$ or the surface resistivity of $10^3 \Omega$ to $10^{11} \Omega$ illustrated in the above-mentioned preferred embodiments can generate a high concentration of ozone gas free of nitrogen oxides with a high degree of efficiency in a similar manner to the use of tungsten oxide when ultrapure oxygen (having a purity of not less than 99.9%) is used as the source gas.

Specific examples of the compound containing at least one selected from the group consisting of titanium, molybdenum, aluminum, magnesium, nickel, yttrium, zirconium, silicon and carbon include oxides of titanium, molybdenum, aluminum, magnesium, nickel, yttrium, zirconium and silicon, nitrides of aluminum and titanium, and silicon carbide.

It has been confirmed that sufficient effects are produced when the ultrapure oxygen used as the source gas in the ozone generating apparatus illustrated in the above-mentioned preferred embodiments has a purity of not less than 99.99% ("4N (four nines)" pure gas), a purity of not less than 99.999% ("5N (five nines)" pure gas), and a purity of not less than 99.9999% ("6N (six nines)" pure gas) in addition to the purity of not less than 99.9% ("3N (three nines)" pure gas) without the addition of nitrogen to oxygen.

However, a gas lower in grade than the above-mentioned gases contains an increased amount of nitrogen in an oxygen cylinder to fail to suppress the production of $NO_X$ in principle. In contrast to this, the use of oxygen having a purity higher than the "5N" purity provides excellent ozone generation characteristics in a similar manner to achieves the generation of a high concentration of clean ozone free of $NO_X$ and metal contamination.

While the invention has been described in detail, the foregoing description is in all aspects illustrative and not restrictive. It is understood that numerous other modifications and variations can be devised without departing from the scope of the invention.

What is claimed is:

1. An ozone generating method comprising:
   providing a pair of electrodes with a discharge space therebetween;
   producing a discharge by the application of an ac voltage between the pair of electrodes;
   providing at least one dielectric between said pair of electrodes;
   providing at least one low-resistance element between at least one of said pair of electrodes and said discharge space, the at least one low-resistance element being distinct from the at least one dielectric, in contact with said discharge, and having a surface resistivity of $10^4 \Omega$ to $10^{11} \Omega$; and
   providing a source gas containing oxygen into the discharge space in which said discharge is produced to generate ozone by the action of said discharge, the source gas provided into said discharge space including ultrapure oxygen having a purity of not less than 99.9%, wherein the low-resistance element is made of tungsten oxide.

2. The ozone generating method according to claim 1, wherein
   said low-resistance element is provided on a surface of at least one of said at least one dielectric.

3. The ozone generating method according to claim 1, wherein
   said low-resistance element is provided on a surface of at least one of said pair of electrodes.

4. The ozone generating method according to claim 1, wherein
   said low-resistance element is made of a compound containing at least one selected from the group consisting of tungsten, titanium, molybdenum, aluminum, magnesium, nickel, yttrium, zirconium, silicon and carbon.

5. The ozone generating method according to claim 1, further comprising:
   providing the at least one dielectric between said pair of electrodes such that each one of the pair of electrodes contacts at most a single dielectric.

6. The ozone generating method according to claim 1, further comprising:
   providing the pair of electrodes with a continuous discharge space therebetween.

* * * * *